United States Patent
Bao et al.

(10) Patent No.: US 11,564,152 B2
(45) Date of Patent: Jan. 24, 2023

(54) DETERMINATION OF SSB/RMSI PERIODICITY FOR IAB NODE

(71) Applicant: Telefonaktiebolaget LM Ericsson (PUBL), Stockholm (SE)

(72) Inventors: Lei Bao, Gothenburg (SE); Erik Dahlman, Stockholm (SE); Zhipeng Lin, Nanjing Jiangsu (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/257,153

(22) PCT Filed: Oct. 25, 2019

(86) PCT No.: PCT/CN2019/113401
§ 371 (c)(1),
(2) Date: Dec. 30, 2020

(87) PCT Pub. No.: WO2020/143279
PCT Pub. Date: Jul. 16, 2020

(65) Prior Publication Data
US 2021/0368425 A1    Nov. 25, 2021

(30) Foreign Application Priority Data
Jan. 11, 2019   (WO) ................. PCT/CN2019/071440

(51) Int. Cl.
*H04W 48/12*       (2009.01)
*H04W 48/16*       (2009.01)

(52) U.S. Cl.
CPC ........... *H04W 48/12* (2013.01); *H04W 48/16* (2013.01)

(58) Field of Classification Search
CPC ..... H04W 48/12; H04W 48/16; H04W 24/02; H04W 24/08; H04W 56/001
See application file for complete search history.

(56) References Cited

U.S. PATENT DOCUMENTS 10,917,185 B2    2/2021  Yoon et al.
11,140,695 B1*  10/2021  Eyuboglu ......... H04W 72/1257
(Continued)

FOREIGN PATENT DOCUMENTS

CN        108513323 A      9/2018
KR     10-2018-0137419 A    12/2018
(Continued)

OTHER PUBLICATIONS

3GPP TR 38.874 v16.0.0; Technical Report; 3rd Generation Partnership Project; Technical Specification Group Radio Access Network; NR; Study on Integrated Access and Backhaul (Release 16)—Dec. 2018.
(Continued)

*Primary Examiner* — Diane D Mizrahi
(74) *Attorney, Agent, or Firm* — Baker Botts, LLP

(57) ABSTRACT

An IAB node performs a method for determining a periodicity of a SSB and/or a RMSI for use in an IAB backhaul link. The method may comprise one or more of: using a predetermined periodicity value; determining a periodicity value based on at least one different parameter; receiving a signaling message indicating a periodicity value and using the indicated periodicity value for the IAB backhaul link; and selecting a periodicity value from a plurality of permitted periodicity values.

19 Claims, 11 Drawing Sheets

(56) References Cited

U.S. PATENT DOCUMENTS

| | | | |
|---|---|---|---|
| 2017/0006499 A1 | 1/2017 | Hampel et al. | |
| 2020/0120622 A1 | 4/2020 | Yoon et al. | |
| 2022/0116924 A1* | 4/2022 | Takeda | H04W 24/02 |

FOREIGN PATENT DOCUMENTS

| | | |
|---|---|---|
| WO | 2018 004408 A1 | 1/2018 |
| WO | 2018 230984 A1 | 12/2018 |

OTHER PUBLICATIONS

European Search Report issued for Application No./Patent No. 19909395.6-1212/3808129 PCT/CN2019113401—dated Jul. 19, 2021.
3GPP TSG RAN WG1 Meeting #94; Gothenburg, Sweden; Source: Huawei, HiSilicon; Title: Physical layer design for NR IAB (R1-1808101)—Aug. 20-24, 2018.
3GPP TSG RAN WG1 Meeting #94-bis; Chengdu, P.R. China; Source: Nokia, Nokia Shanghai Bell; Title: Discovery and measurements for IAB (R1-1810677)—Oct. 8-12, 2018.
3GPP TSG RAN WG1 Meeting 94bis; Chengdu, China; Source: CMCC; Title: Discussions on enhancements to support NR Backhaul links (R1-1811035)—Oct. 8-12, 2018.
Examination Report issued by Intellectual Property India for Application No. 202037056110—dated Dec. 30, 2021.
PCT Notification of Transmittal of the Internatinoal Search Report and the Written Opinion of the International Searching Authority, or the Declaration issued for International application No. PCT/CN2019/113401—dated Jan. 23, 2020.
3GPP TSG RAN WG1 Meeting #93; Busan, Korea; Source: ZTE; Title: IAB scenarios and evaluations (R1-1806025)—May 21-25, 2018.
3GPP TSG RAN WG1 Meeting #94bis; Chengdu, China; Source: Ericsson; Title: Updated summary of 7.2.3.1 Enhancements to support NR backhaul links (R1-1812042)—Oct. 8-12, 2018.
3GPP TSG RAN WG1 Meeting #95; Spokane, USA; Source: NTT Docomo, Inc.; Title: Discussion on enhancements to support NR backhaul links (R1-1813316)—Nov. 12-16, 2018.

* cited by examiner

302
Determine periodicity using a predetermined periodicity value.

Figure 3

402
Determine a periodicity value based on at least one different parameter

Figure 4

502
Receive a signalling message indicating a periodicity value

504
Use the indicated periodicity value for the IAB backhaul link

Figure 5

602
Determine periodicity by selecting a periodicity value from a plurality of permitted periodicity values.

DETERMINATION OF SSB/RMSI PERIODICITY FOR IAB NODE

PRIORITY

This nonprovisional application is a U.S. National Stage Filing under 35 U.S.C. § 371 of International Patent Application Serial No. PCT/CN2019/113401 filed Oct. 25, 2019 and entitled "Determination of SSB/RMSI Periodicity for IAB Node" which claims priority to PCT International Patent Application No. PCT/CN2019/071440 filed Jan. 11, 2019 both of which are hereby incorporated by reference in their entirety.

TECHNICAL FIELD

Embodiments described herein relate to methods and apparatus for use in integrated access and backhaul.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

General Introduction of the Initial Access of IAB Node

In a multi-hop wireless relay network, some User Equipments (UEs) connect to the network via relay nodes over more than one hop. In FIG. 1, a multi-hop integrated access and backhaul (IAB) deployment is presented, where the IAB donor node (in short IAB donor) has a wired connection to the core network and the IAB relay nodes (in short IAB nodes) are wirelessly connected to the IAB donor as child nodes, either directly (single hop) or indirectly via other IAB nodes (multi-hop). The connection between IAB donor/node and UEs is called access link, whereas the connection between two IAB nodes or between an IAB donor and an IAB node is called backhaul link. For the IAB network, the backhaul links are realized as NR wireless links. The IAB donor and some of the IAB nodes serve not only the UE traffic within the serving range over the access link, but also the aggregated traffic from/to their child nodes over the backhaul link.

When an IAB node is turned on, its parent node, i.e. which node (for example, a donor node in case of single hop or another already connected IAB node in case of multi-hop) to eventually connect to, needs to be decided. For example, in the case of FIG. 1, the IAB node 2 (IAB-N2) can either connect to IAB-N1 or directly to the IAB donor (IAB-DN). The connection determination of each IAB node forms a certain topology between the IAB donor and IAB nodes that impacts on the achievable performance of the UEs.

For different reasons, an already connected IAB node may also, potentially, have to change its connection to a different parent node.

The Mobile-Termination (MT) function has been defined as a component of an IAB node. In the context of the IAB study, MT is referred to as a function residing on an IAB-node that terminates radio interface layers of the backhaul Uu interface toward the IAB-donor or other parent IAB-nodes.

FIG. 2 shows a reference diagram for IAB in standalone mode, which contains an IAB-donor and multiple IAB-nodes. The IAB-donor is treated as a single logical node that comprises a set of functions such as gNB-DU (where DU means Distribution Unit), gNB-CU-CP (where CU means Central Unit, and CP means Control Plane), gNB-CU-UP (where CU means Central Unit, and UP means User Plane), and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks. Note that besides an IAB donor, an IAB node also has its DU function.

Within 3GPP discussion on IAB, the related topic of IAB-node initial access (stage1) and IAB-node discovery and measurement (Stage 2) are discussed.

IAB-Node Initial Access (Stage 1):

In case of standalone (SA) deployments, initial IAB node discovery by the MT (Stage 1) function follows the same 3GPP Rel-15 initial access procedure as an UE, including cell search based on the same Synchronization Signal/Physical Broadcast Channel blocks (SS/PBCH blocks or SSBs) available for access UEs, SI (System Information) acquisition, and random access, in order to initially set up a connection to a parent IAB-node or a IAB-donor.

In case of a non-standalone (NSA) deployment, when MT function of an IAB-node performs initial access on NR carrier (however a UE performs initial access on LTE carrier), it follows the same Stage-1 initial access as an accessing UE in SA deployments. The periodicity of SSB set and/or RMSI (Remaining Minimum System Information) assumed by the MTs for initial access may be longer than 20 ms which is assumed by Rel-15 UEs, and a single value is to be selected from the following candidate values: 20 ms, 40 ms, 80 ms, 160 ms.

Note: This implies that the candidate parent IAB-nodes/donors must support both NSA functionality for the UE and SA functionality for the MT on the NR carrier.

Inter-IAB-Node Discovery and Measurement (Stage 2):

For the purpose of backhaul link reference signal received power/reference signal received quality (RSRP/RSRQ) RRM measurements, IAB supports both SSB-based and CSI-RS (Channel State Information Reference Signal) based solutions.

For the purpose of inter-IAB-node and donor detection after the IAB-node DU becomes active (Stage 2), the inter IAB-node discovery procedure needs to take into account the half-duplex constraint at an IAB-node and multi-hop topologies. The following three solutions are supported:

SSB-Based Solutions (Solution 1-A and 1-B):
Solution 1-A) Reusing the same set of SSBs used for access UEs:
In this case, the SSBs for inter-IAB cell search in stage 2 are on the currently defined sync raster for a SA frequency layer, while for a NSA frequency layer the SSBs are transmitted inside of the SMTC (SSB Measurement Time Configuration) configured for access UEs.

Solution 1-B) Use of SSBs which are orthogonal (TDM and/or FDM) with SSBs used for access UEs:

In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access UEs.

An IAB-node should not mute its own SSB transmissions targeting UE cell search and measurement when doing inter-IAB cell search in stage 2:

For SA, this means that SSBs transmitted on the currently defined sync raster follow the currently defined periodicity for initial access;

In case of Solution 1-B, this implies SSBs, that may get muted, for inter-IAB stage 2 cell search is at least TDM with SSBs used for UE cell search and measurements.

CSI-RS Based Solutions (Solution 2):

CSI-RS can be used for inter-IAB detection in synchronous network

To support IAB-node initial access and Stage 2 inter-IAB-node discovery and measurement, enhancements to existing Rel.15 SMTC/CSI-RS/RACH configurations and RMSI (Remaining Minimum System Information) may need to be supported as well as coordination across IAB-nodes.

SSB/RMSI Periodicity in NR Release 15

A UE can be provided per serving cell by higher layer parameter ssb-periodicityServingCell a periodicity of a half frames for reception of a full set of SS/PBCH blocks (SSBs) of the serving cell. If the UE is not configured a periodicity of the half frames for receptions of the set of SS/PBCH blocks, the UE assumes a periodicity of the half frame on which a SSB set is carried. A UE assumes that the periodicity is same for all SS/PBCH block sets in the serving cell.

For initial cell selection, a UE may assume that half frames with SS/PBCH block sets occur with a periodicity of 2 frames, i.e. 20 ms.

The ssb-PeriodicityServingCell can be 5 ms, 10 ms, 20 ms, 40 ms, 80 ms, or 160 ms, which may be signaled in the IE ServingCellConfigCommon with which the network provides this information in dedicated signalling when configuring a UE with a SCells or with an additional cell group (SCG). It also provides it for SpecialCells (SpCells) in Master Cell Group (MCG) and SCG upon reconfiguration with sync.

It is also included in ServingCellConfigCommonSIB IE which is used to configure cell specific parameters of a UE's serving cell in SIB1.

```
-- ASN1START
-- TAG-SERVINGCELLCONFIGCOMMONSIB-START
ServingCellConfigCommonSIB ::=    SEQUENCE {
    dowlinkConfigCommon               DownlinkConfigCommonSIB,
    uplinkConfigCommon                UplinkConfigCommonSIB
    OPTIONAL,      -- Need R
    supplementaryUplink               UplinkConfigCommonSIB
    OPTIONAL,      -- Need R
    n-TimingAdvanceOffset             ENUMERATED { n0, n25560, n39936 }
    OPTIONAL,      -- Need S
    ssb-PositionsInBurst                SEQUENCE {
        inOneGroup                      BIT STRING (SIZE (8)),
        groupPresence                   BIT STRING (SIZE (8))
    OPTIONAL -- Cond Above6GHzOnly
    },
    ssb-PeriodicityServingCell        ENUMERATED {ms5, ms10, ms20, ms40, ms80, ms160},
    tdd-UL-DL-ConfigurationCommon     TDD-UL-DL-ConfigCommon
    OPTIONAL, -- Cond TDD
    ss-PBCH-BlockPower                INTEGER (-60..50),
    ...
}
-- TAG-SERVINGCELLCONFIGCOMMONSIB-STOP
-- ASN1STOP
```

There currently exist certain challenge(s). The SSB/RMSI periodicity assumed by the MTs for initial access and measurement may be different from the SSB/RMSI periodicity assumed by Rel-15 UEs, and methods on the determination of the SSB/RMSI periodicity are required.

SUMMARY

Certain aspects of the present disclosure and their embodiments may provide solutions to these or other challenges. Specifically, this disclosure provides methods on the determination of the periodicity of system information for the initial access and/or measurement of an IAB node.

There are, proposed herein, various embodiments which address one or more of the issues disclosed herein.

According to an aspect of the embodiments of the disclosure, a method performed at an IAB node is introduced. During the IAB node gets initial access to a first parent IAB node, wherein the IAB node firstly join an IAB backhaul link, the IAB node first assumes a predetermined SSB transmission periodicity, and then searches an SSB at the predetermined SSB transmission periodicity. Then, the IAB node completes its initial access to the first parent IAB node.

According to another aspect of the embodiments of the disclosure, a method performed at an IAB node is introduced. During the IAB node gets initial access to a parent IAB node, it first determines its availability of SSB transmission periodicity. If there's no information on actual SSB transmission periodicity in the IAB node, it assumes a default SSB transmission periodicity, and then searches an SSB at the default SSB transmission periodicity. If an actual SSB transmission periodicity is available in the IAB node, it searches an SSB at the actual SSB transmission periodicity.

According to another aspect of the embodiments of the disclosure, a base station performed by an IAB node is introduced. It comprises a processing circuitry configured to perform the steps introduced in the disclosure.

Certain embodiments may provide one or more of the following technical advantage(s).

Thus, the disclosure provides methods on the determination of the system information, especially the Synchronization Signals and Physical Broadcast Channel (SSB) periodicity and/or Remaining Minimum System Information (RMSI) periodicity for the initial access and/or measurement of an IAB node.

BRIEF DESCRIPTION OF THE DRAWINGS

FIG. 3 depicts a method in accordance with a first group of embodiments.

FIG. 4 depicts a method in accordance with a second group of embodiments.

FIG. 5 depicts a method in accordance with a third group of embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments and groups of embodiments are provided in this invention for the determination of the periodicity of system information for IAB node for initial access and/or measurement.

Figure 1:
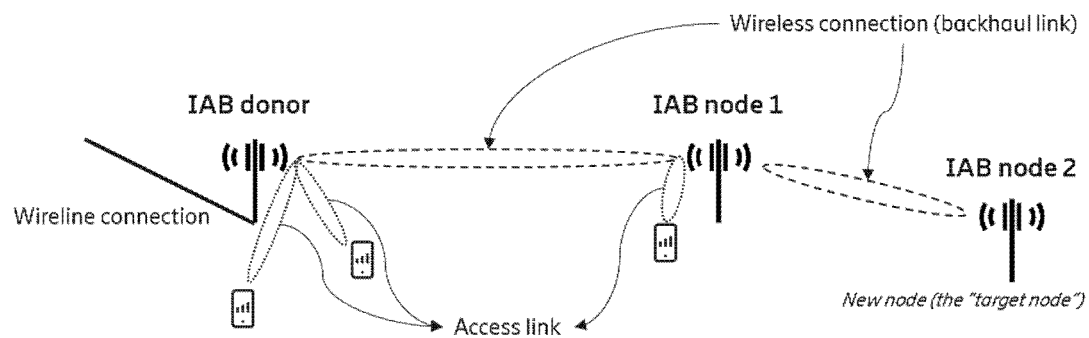
FIG. 1 illustrates a multi-hop deployment in an integrated access and backhaul (IAB) network.
Figure 2:
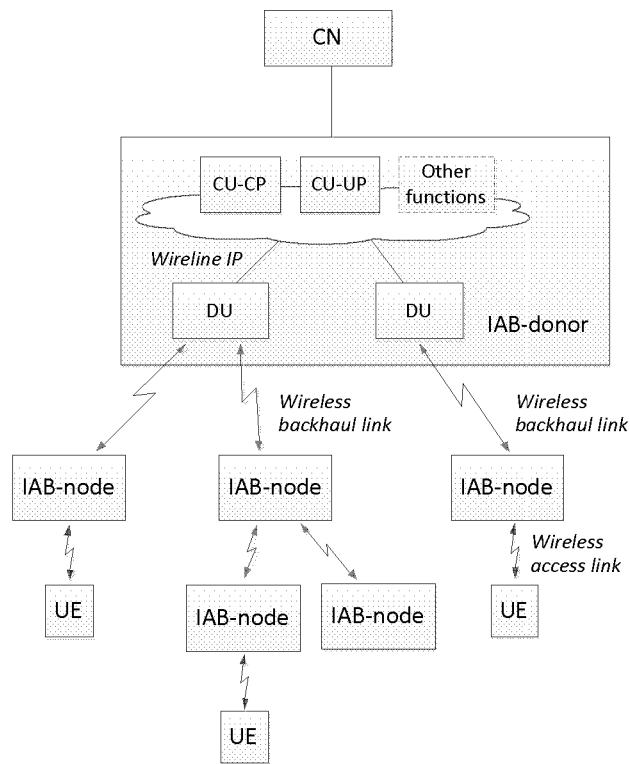
FIG. 2 is a reference diagram for IAB-architectures in standalone mode.

The methods described below are separately useable when the MT function, in a base station that is acting as an IAB node, establishes a wireless backhaul connection to an existing IAB node. The methods are also useable when the MT function, in a base station that is acting as an IAB node, wants to do some measurements on the SSBs. The methods concern how the base station determines an SSB periodicity and/or RMSI periodicity. FIG. 1 illustrates a network in which such a process may be required.

In the light of an SSB usually contains system information, such as MIB or some other system information in PBCH, and RMSI belongs to system information, the methods described below concern how periodicity of system information is determined for IAB backhaul link. In other words, when MIB periodicity is determined, SSB periodicity is determined as the same. When the system information is RMSI, RMSI periodicity is determined for IAB backhaul link. Also note that some of the embodiments below take the determination of SSB periodicity as example, while determination of RMSI periodicity can follow the similar approaches which are not described for simplicity.

The methods described herein are also useable when the MT function in a terminal device, such as a User Equipment, establishes a wireless backhaul connection to an existing IAB node, and/or when the MT function in a terminal device wants to do some measurements on the SSBs. Thus, in the following description, the term "IAB node" is used to refer to base station or to terminal device (hereinafter UE as example) when the terminal device having a backhaul connection to an IAB node. Most of the following embodiments take a base station as an example of an IAB node for simplicity.

In a first group of embodiments, the periodicity or a default periodicity is predetermined or fixed.

Thus, the base station, and more specifically the MT function when acting as an IAB node, uses a predetermined or fixed periodicity for SSB, including SSB set transmission and/or SSB measurement. For simplicity, a periodicity for SSB set transmission is called SSB transmission periodicity in this disclosure, not limited to this group of embodiments.

For example, the base station may be configured such that a 160 ms periodicity, which is the same as the RMSI TTI (Transmission Time Interval) in NR release 15, is always assumed no matter which periodicity of SSB for UE is signalled. The base station may be configured such that any other periodicity is predetermined.

FIG. 3 depicts a method in accordance with the first group of embodiments. In particular, FIG. 3 shows a method performed by an IAB node for determining a periodicity of a SSB for use in an IAB backhaul link. Specifically, in step 302, the IAB node uses a predetermined periodicity value as the SSB transmission periodicity at stage 1 or SSB measurement periodicity at stage 2.

In another example, periodicity for the RMSI of the base station may be configured in a similar way, that is to say, a predetermined or fixed periodicity.

In the circumstance that the periodicity for the SSB and the RMSI are both configured a fixed length, the periodicity for the SSB and the periodicity for the RMSI can be a same or different length. Preferably, transmission of the RMSI is less frequent than transmission of the SSB.

In a second group of embodiments, the periodicity SSB is associated to other parameters.

Thus, the base station, and more specifically the MT function when acting as an IAB node, uses a periodicity value for the SSB in which MIB is contained that is determined based on some other factor or parameter.

One example is that the periodicity is associated to the frequency band applied.

For example, 2 values can be set respectively for low band (band lower than e.g. 6 GHz) and high band (band higher than e.g. 6 GHz) as is shown in below table.

| Frequency range of a band in operation | SSB periodicity for IAB node |
|---|---|
| low band | 320 ms |
| high band | 160 ms |

Another example is that the periodicity is associated to the SSB periodicity for UE signalled in UE SIB1. A UE SIB1 refers to a SIB1 message broadcasted by a base station for all the UEs in a cell.

One possibility is that the periodicity value is set to be equal to the SSB transmission and/or measurement periodicity value signalled for use by a UE.

Another possibility is to set a minimum periodicity value, and (i) to set the periodicity value to be equal to the SSB periodicity value signaled for use by a UE when the periodicity value signaled for use by a UE is greater than the minimum periodicity value, and (ii) to set the periodicity value to be equal to the minimum periodicity value when the periodicity value signaled for use by a UE is less than the minimum periodicity value.

As an example, a minimum value of 20 ms may be set, and then, if the SSB periodicity for UE is not less than 20 ms, they can be the same; otherwise, 20 ms periodicity is assumed.

| SSB periodicity for UE P0 | SSB periodicity for IAB P1 |
|---|---|
| P0 >= 20 ms | P1 = P0 |
| P0 < 20 ms | 20 ms |

SSB transmission and/or measurement for use in an IAB backhaul link. Specifically, in step 402, the IAB node determines a periodicity value based on at least one different parameter. In the second group of embodiments, periodicity for transmission of the RMSI for use in an IAB backhaul link can be determined in the similar way as illustrated above. In the following embodiments, determination of RMSI periodicity for an IAB node for initial access or measurement will not be illustrated separately from determination of SSB periodicity for an IAB node for simplicity, while the determination of RMSI periodicity might be executed separately from the determination of SSB periodicity, for example, by following different groups of embodiments or different examples in a same group of embodiments.

In a third group of embodiments, the periodicity of SSB set and/or RMSI transmission and/or measurement can be signalled, e.g. via UE SIB1 or UE MIB, and/or via a newly defined IAB SIB or IAB MIB, and a default SSB and/or RMSI periodicity can be assumed for initial access before actual indicated SSB and/or RMSI is available.

A UE MIB refers to a master information block (MIB) broadcasted in a UE SSB from a base station for all the UEs in a cell. An IAB SIB may refers to a message sent from an IAB node as parent node for all the other nodes that can establish an IAB backhaul link with it. An IAB MIB may refers to a message sent in an IAB SSB from an IAB node as parent node for all the other nodes that can establish an IAB backhaul link with it.

Thus, the base station, and more specifically the MT function when acting as an IAB node, uses a periodicity for SSB set and/or the RMSI transmission and/or measurement that is signalled to it. The value may be signalled by the parent node, that is the IAB donor, or the other IAB node with which the base station wishes to establish an IAB backhaul link.

For example, a default periodicity can be 160 ms and a parameter "IABssb-PeriodicityServingCell" can be included as shown below:

```
-- ASN1START
-- TAG-SERVINGCELLCONFIGCOMMONSIB-START
ServingCellConfigCommonSIB ::=      SEQUENCE {
    dowlinkConfigCommon                  DownlinkConfigCommonSIB,
    uplinkConfigCommon                   UplinkConfigCommonSIB
OPTIONAL,       -- Need R
    supplementaryUplink                  UplinkConfigCommonSIB
OPTIONAL,       -- Need R
    n-TimingAdvanceOffset                ENUMERATED { n0, n25560, n39936 }
OPTIONAL,       -- Need S
    ssb-PositionsInBurst                 SEQUENCE {
        inOneGroup                       BIT STRING (SIZE (8)),
        groupPresence                    BIT STRING (SIZE (8))
OPTIONAL -- Cond Above6GHzOnly
    },
    ssb-PeriodicityServingCell           ENUMERATED {ms5, ms10, ms20, ms40, ms80,
ms160},
    IABssb-PeriodicityServingCell        ENUMERATED {ms10, ms40, ms80, ms160, ms320,
ms480},
    tdd-UL-DL-ConfigurationCommon        TDD-UL-DL-ConfigCommon
OPTIONAL, -- Cond TDD
    ss-PBCH-BlockPower                   INTEGER (-60..50),
    ...
}
-- TAG-SERVINGCELLCONFIGCOMMONSIB-STOP
-- ASN1STOP
```

FIG. 4 depicts a method in accordance with the second group of embodiments. In particular, FIG. 4 shows a method performed by an IAB node for determining a periodicity of FIG. 5 depicts a method in accordance with the third group of embodiments. In particular, FIG. 5 shows a method performed by an IAB node for determining a periodicity of of SSB set and/or RMSI transmission and/or measurement for use in an IAB backhaul link. As mentioned above, the SSB set for use in an IAB backhaul link can specifically be used for IAB backhaul link, or it can also be a same set of SSBs used for access UEs. Specifically, FIG. 5 shows a method beginning at step 502, in which the IAB node receives a signaling message indicating a periodicity value. Then, in step 504, the IAB node uses the indicated periodicity value for joining IAB backhaul link.

In accordance with the third group of embodiments, a process is also performed in the base station acting as the parent node. Specifically, said base station performs a method comprising signaling a periodicity of transmission of SSB and/or RMSI for use by an IAB node in an IAB backhaul link with said base station.

The periodicity may be included as a parameter in a UE SIB1 and/or IAB SIB transmitted from the base station. Alternatively, the periodicity may be included as a parameter in a UE MIB and/or IAB MIB transmitted from the base station. A first indicated periodicity value may be signalled for the SSB and a second indicated periodicity value may be signalled for the RMSI. In that case, the first indicated periodicity value may be different from the second indicated periodicity value.

Different periodicity values may be indicated for different processes. In that case, the processes may be selected from: IAB node initial access, IAB node detection, and IAB node measurement.

In a fourth group of embodiments one periodicity can be assumed and randomly selected from a set of candidates by the receiver (child IAB node) itself.

Thus, the base station, and more specifically the MT function when acting as an IAB node, uses a selected periodicity for the SSB and/or the RMSI, where the periodicity is selected value from a plurality of predetermined permitted periodicity values. For example, the periodicity may be randomly selected from the plurality of permitted periodicity values. The base station may be configured with the plurality of permitted periodicity values, which form a candidate set. For example, the set of candidates may be 5 ms, 10 ms, 20 ms, 40 ms, 80 ms, and 160 ms, or may include or comprise some of those values.

A periodicity may be chosen and used on any subsequent occasions, or a new periodicity value may be selected whenever a periodicity is needed.

Figures 6, 7:
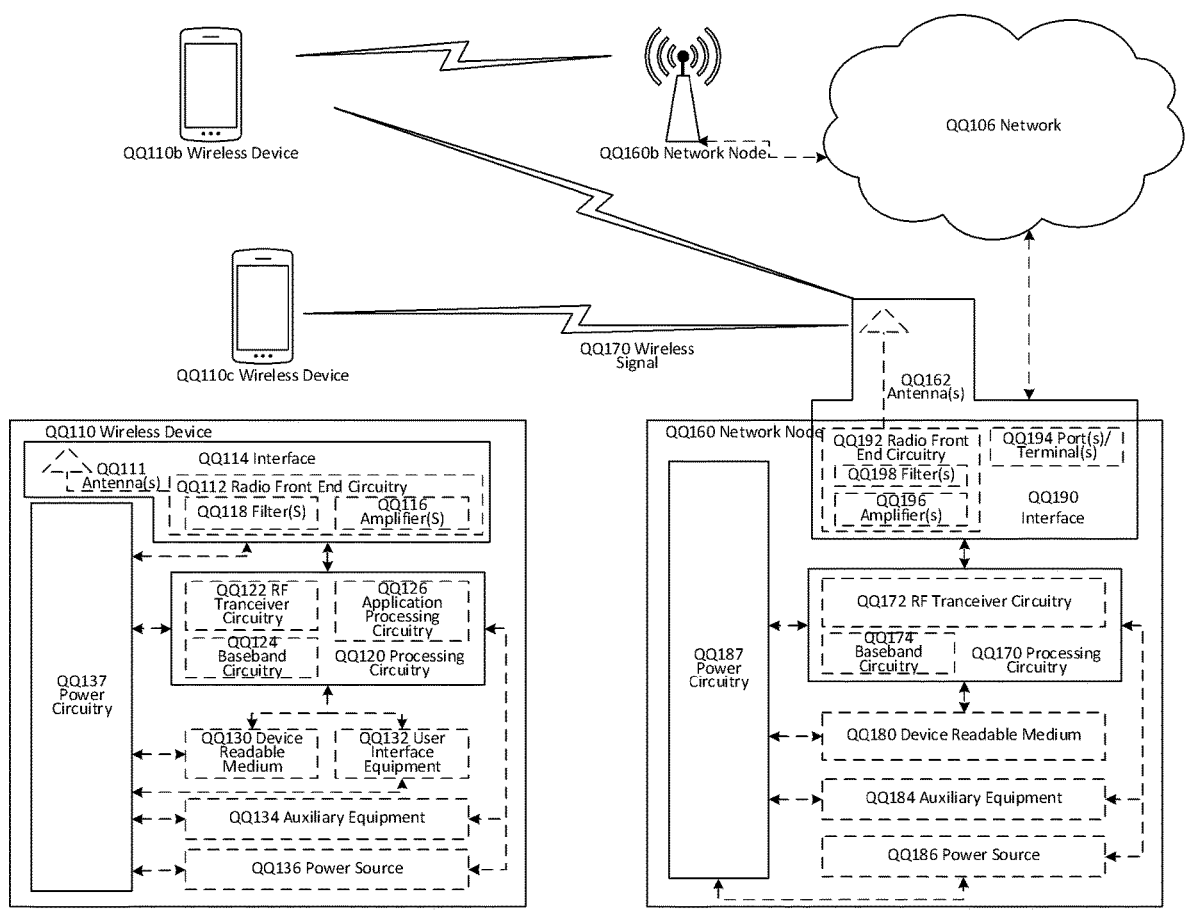
FIG. 6 depicts a method in accordance with a fourth group of embodiments.
FIG. 7 illustrates a wireless network in which the methods may be used.

FIG. 6 depicts a method in accordance with the fourth group of embodiments. In particular, FIG. 6 shows a method performed by an IAB node for determining a periodicity of a SSB and/or a RMSI for use in an IAB backhaul link. Specifically, in step 602, the IAB node selects a periodicity value from a plurality of permitted periodicity values.

In any of the groups of embodiments described above, the SSB periodicity and the RMSI periodicity can be either the same or different. Specifically, the SSB periodicity may be determined by a method in accordance with one group of embodiments, while the RMSI periodicity is determined by a method in accordance with a different group of embodiments.

Alternatively, the SSB periodicity and the RMSI periodicity may be determined by methods in accordance with the same group of embodiments, but in a way that may produce different results. For example, in the first group of embodiments, different predetermined or fixed periodicities may be used for the SSB periodicity and the RMSI periodicity. In the second group of embodiments, different parameters may be used for determining the SSB periodicity and the RMSI periodicity. In the third group of embodiments, different values of the SSB periodicity and the RMSI periodicity may be signalled. In the fourth group of embodiments, the IAB node may select different values for the SSB periodicity and the RMSI periodicity from the plurality of permitted periodicity values. Thus, there may be separate signalling and/or assumptions applied for the SSB periodicity and the RMSI periodicity for the IAB node.

In any of the groups of embodiments described above, different or separate SSB periodicities may be determined for the purpose of different processes performed by the IAB node, such as IAB node initial access, IAB node detection and IAB node measurement. At least one of these different periodicities may be determined by means of a method in accordance with any of the groups of embodiments, i.e. by using a predetermined periodicity value; determining a periodicity value based on at least one different parameter; receiving a signaling message indicating a periodicity value and using the periodicity value from a plurality of permitted periodicity values.

For example, different periodicity values may be used for IAB node initial access and for IAB node detection. As another example, different periodicity values may be used for IAB node measurement and for IAB node initial access. As another example, different periodicity values may be used for IAB node detection and for IAB node measurement.

As mentioned above, any of the methods described above may be performed by a Mobile Termination function of a base station acting as an IAB node. As another example, any of the methods described above may be performed by a Mobile Termination function of a User Equipment.

Below are some embodiments listed for further illustrating the invention while the idea of the invention is not limited to those listed embodiments.

1. A method performed by an IAB node for determining a periodicity of a SSB and/or a RMSI for use in an IAB backhaul link, the method comprising:
   using a predetermined periodicity value.
2. The method of embodiment 1, comprising using the predetermined periodicity value even when it differs from a periodicity signaled for use by a UE.
3. The method of embodiment 1 or 2, comprising using a first predetermined periodicity value for the SSB and using a second predetermined periodicity value for the RMSI.
4. The method of embodiment 3, wherein the first predetermined periodicity value is different from the second predetermined periodicity value.
5. The method of any of embodiments 1-4, comprising using different predetermined periodicity values for different processes.
6. The method of embodiment 5, wherein the processes are selected from: IAB node initial access, IAB node detection, and IAB node measurement.
7. The method of any of embodiments 1-6, comprising determining the periodicity of the SSB and/or the RMSI for use in an IAB backhaul link when the IAB node establishes a wireless backhaul connection to an existing IAB node.
8. The method of any of embodiments 1-6, comprising determining the periodicity of the SSB when the IAB node wishes to perform measurements on SSBs.
9. The method of embodiment 8, wherein the determined periodicity of the SSB is part of the SSB based RRM measurement Timing Configuration, SMTC.
10. A method performed by an IAB node for determining a periodicity of a SSB and/or a RMSI for use in an IAB backhaul link, the method comprising:

determining a periodicity value based on at least one different parameter.

11. The method of embodiment 10, comprising determining the periodicity value based on a frequency band being used for the IAB backhaul link.

12. The method of embodiment 10 or 11, comprising determining the periodicity value based on a SSB periodicity value signaled for use by a UE.

13. The method of embodiment 12, comprising setting the periodicity value to be equal to the SSB periodicity value signaled for use by a UE.

14. The method of embodiment 13, comprising setting a minimum periodicity value, and (i) setting the periodicity value to be equal to the SSB periodicity value signaled for use by a UE when the periodicity value signaled for use by a UE is not less than the minimum periodicity value, and (ii) setting the periodicity value to be equal to the minimum periodicity value when the periodicity value signaled for use by a UE is less than the minimum periodicity value.

15. The method of one of embodiments 10 to 14, comprising using a first determined periodicity value for the SSB and using a second determined periodicity value for the RMSI.

16. The method of embodiment 15, wherein the first determined periodicity value is different from the second predetermined periodicity value.

17. The method of any of embodiments 10-16, comprising using different determined periodicity values for different processes.

18. The method of embodiment 17, wherein the processes are selected from: IAB node initial access, IAB node detection, and IAB node measurement.

19. The method of any of embodiments 10-18, comprising determining the periodicity of the SSB and/or the RMSI for use in an IAB backhaul link when the IAB node establishes a wireless backhaul connection to an existing IAB node.

20. The method of any of embodiments 10-18, comprising determining the periodicity of the SSB when the IAB node wishes to perform measurements on SSBs.

21. The method of embodiment 20, wherein the determined periodicity of the SSB is part of the SSB based RRM measurement Timing Configuration, SMTC.

22. A method performed by an IAB node for determining a periodicity of a SSB and/or a RMSI for use in an IAB backhaul link, the method comprising:
receiving a signaling message indicating a periodicity value; and
using the indicated periodicity value for the IAB backhaul link.

23. The method of embodiment 22, comprising receiving the signaling message from a second IAB node with which said IAB node wishes to establish the IAB backhaul link.

24. The method of embodiment 23, wherein the periodicity value is included as a parameter in a UE SIB1 and/or IAB SIB transmitted from the second IAB node.

25. The method of embodiment 23, wherein the periodicity value is included as a parameter in a UE MIB and/or IAB MIB transmitted from the second IAB node.

26. The method of one of embodiments 22-25, comprising using a default periodicity value before receiving said signaling message.

27. The method of one of embodiments 22-26, comprising using a first indicated periodicity value for the SSB and using a second indicated periodicity value for the RMSI.

28. The method of embodiment 27, wherein the first indicated periodicity value is different from the second indicated periodicity value.

29. The method of any of embodiments 22-28, comprising using different indicated periodicity values for different processes.

30. The method of embodiment 29, wherein the processes are selected from: IAB node initial access, IAB node detection, and IAB node measurement.

31. The method of any of embodiments 22-30, comprising determining the periodicity of the SSB and/or the RMSI for use in an IAB backhaul link when the IAB node establishes a wireless backhaul connection to an existing IAB node.

32. The method of any of embodiments 22-30, comprising determining the periodicity of the SSB when the IAB node wishes to perform measurements on SSBs.

33. The method of embodiment 32, wherein the determined periodicity of the SSB is part of the SSB based RRM measurement Timing Configuration, SMTC.

34. A method performed by an IAB node for determining a periodicity of a SSB and/or a RMSI for use in an IAB backhaul link, the method comprising:
selecting a periodicity value from a plurality of permitted periodicity values.

35. The method of embodiment 34, comprising randomly selecting the periodicity value from the plurality of permitted periodicity values.

36. The method of embodiment 34 or 35, comprising using a first selected periodicity value for the SSB and using a second selected periodicity value for the RMSI.

37. The method of embodiment 36, wherein the first selected periodicity value is different from the second selected periodicity value.

38. The method of any of embodiments 34-37, comprising using different selected periodicity values for different processes.

39. The method of embodiment 38, wherein the processes are selected from: IAB node initial access, IAB node detection, and IAB node measurement.

40. The method of any of embodiments 34-39, comprising determining the periodicity of the SSB and/or the RMSI for use in an IAB backhaul link when the IAB node establishes a wireless backhaul connection to an existing IAB node.

41. The method of any of embodiments 34-39, comprising determining the periodicity of the SSB when the IAB node wishes to perform measurements on SSBs.

42. The method of embodiment 41, wherein the determined periodicity of the SSB is part of the SSB based RRM measurement Timing Configuration, SMTC.

43. A method performed by an IAB node for determining a periodicity of a SSB and a RMSI for use in an IAB backhaul link, wherein the periodicity of the SSB and the periodicity of the RMSI may be the same or different.

44. A method performed by an IAB node for determining a periodicity of a SSB and a RMSI for use in an IAB backhaul link, wherein the periodicity of the SSB and the periodicity of the RMSI are different.

45. A method performed by an IAB node for determining a periodicity of a SSB and a RMSI for use in an IAB backhaul link, comprising determining the periodicity of the SSB by means of a first method and determining the periodicity of the RMSI by means of a different method.

46. The method of embodiment 45, wherein at least one of the first method and the second method are selected from:
   using a predetermined periodicity value;
   determining a periodicity value based on at least one different parameter.
   receiving a signaling message indicating a periodicity value and using the indicated periodicity value for the IAB backhaul link; and
   selecting a periodicity value from a plurality of permitted periodicity values.

47. A method performed by an IAB node for determining a periodicity of a SSB for use in an IAB backhaul link, the method comprising:
   using separately determined periodicity values for different processes.

48. The method of embodiment 47, wherein the processes are selected from: IAB node initial access, IAB node detection, and IAB node measurement.

49. The method of embodiment 47 or 48, wherein at least one of the periodicity values are determined by:
   using a predetermined periodicity value;
   determining a periodicity value based on at least one different parameter.
   receiving a signaling message indicating a periodicity value and using the indicated periodicity value for the IAB backhaul link; and
   selecting a periodicity value from a plurality of permitted periodicity values.

50. The method of one of embodiments 47-49, comprising using different periodicity values for IAB node initial access and for IAB node detection, and/or using different periodicity values for IAB node measurement and for IAB node initial access, and/or using different periodicity values for IAB node detection and for IAB node measurement.

51. The method of any preceding embodiment, performed by a Mobile Termination function of a base station acting as an IAB node.

52. A method performed by a base station acting as an IAB node, the method comprising signaling a periodicity of a SSB and/or a RMSI for use by an IAB node in an IAB backhaul link with said base station.

53. The method of embodiment 52, comprising including the periodicity as a parameter in a UE SIB1 and/or IAB SIB transmitted from the base station.

54. The method of embodiment 52, comprising including the periodicity as a parameter in a UE MIB and/or IAB MIB transmitted from the base station.

55. The method of one of embodiments 52-54, comprising using a first indicated periodicity value for the SSB and using a second indicated periodicity value for the RMSI.

56. The method of embodiment 55, wherein the first indicated periodicity value is different from the second indicated periodicity value.

57. The method of any of embodiments 52-56, comprising using different indicated periodicity values for different processes.

58. The method of embodiment 57, wherein the processes are selected from: IAB node initial access, IAB node detection, and IAB node measurement.

59. The method of any of the previous embodiments, further comprising:
   obtaining user data; and
   forwarding the user data to a host computer or a wireless device.

60. A base station for use as an IAB node, the base station comprising:
   processing circuitry configured to perform any of the steps of any of embodiments 1-59;
   power supply circuitry configured to supply power to the base station.

61. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of embodiments 1-59.

62. The communication system of embodiment 61 further including the base station.

63. The communication system of embodiment 61 or 62 further including the UE, wherein the UE is configured to communicate with the base station.

64. The communication system of embodiments 61-63, wherein:
   the processing circuitry of the host computer is configured to execute a host application, thereby providing the user data; and
   the UE comprises processing circuitry configured to execute a client application associated with the host application.

65. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of embodiments 1-59.

66. The method of embodiment 65, further comprising, at the base station, transmitting the user data.

67. The method of embodiments 65-66, wherein the user data is provided at the host computer by executing a host application, the method further comprising, at the UE, executing a client application associated with the host application.

68. The method of embodiments 65-67, wherein the base station performs said steps in a MT function.

69. A user equipment (UE) configured to communicate with a base station, the UE comprising a radio interface and processing circuitry configured to performs the steps of embodiments 65-68.

70. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 1-59.

71. The communication system of embodiment 70 further including the base station.

72. The communication system of embodiments 70-71, further including the UE, wherein the UE is configured to communicate with the base station.
73. The communication system of embodiments 70-72, wherein:
the processing circuitry of the host computer is configured to execute a host application;
the UE is configured to execute a client application associated with the host application, thereby providing the user data to be received by the host computer.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
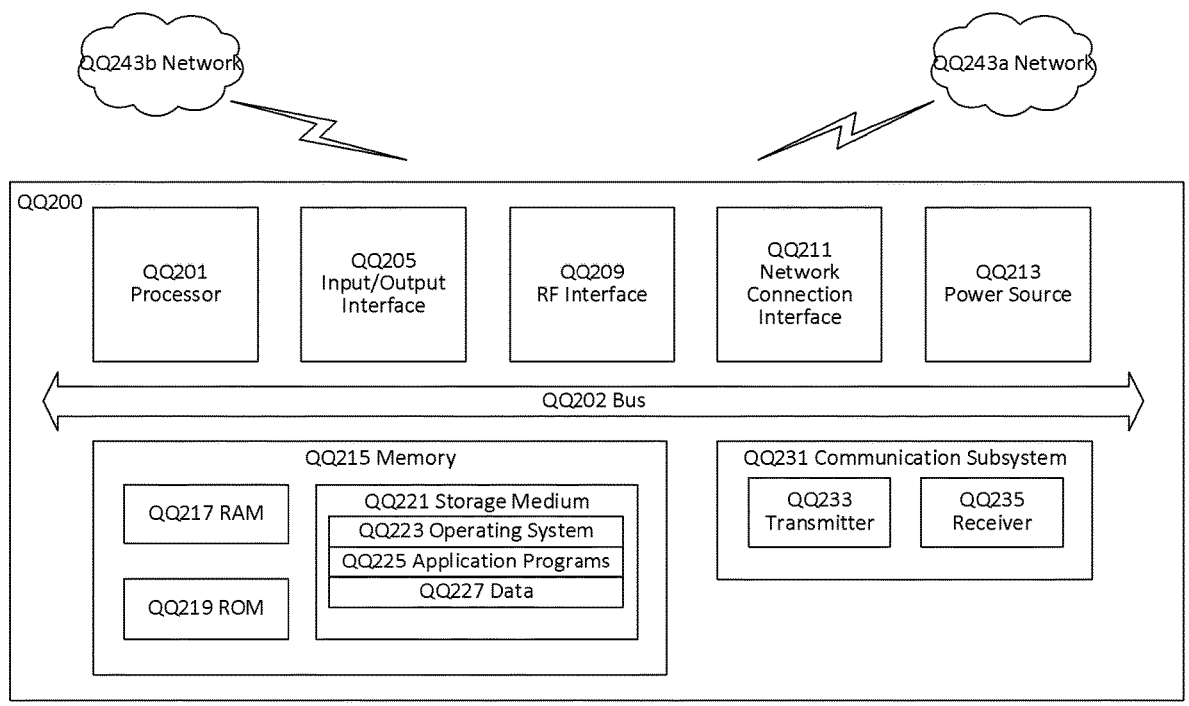
FIG. 8 illustrates a User Equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
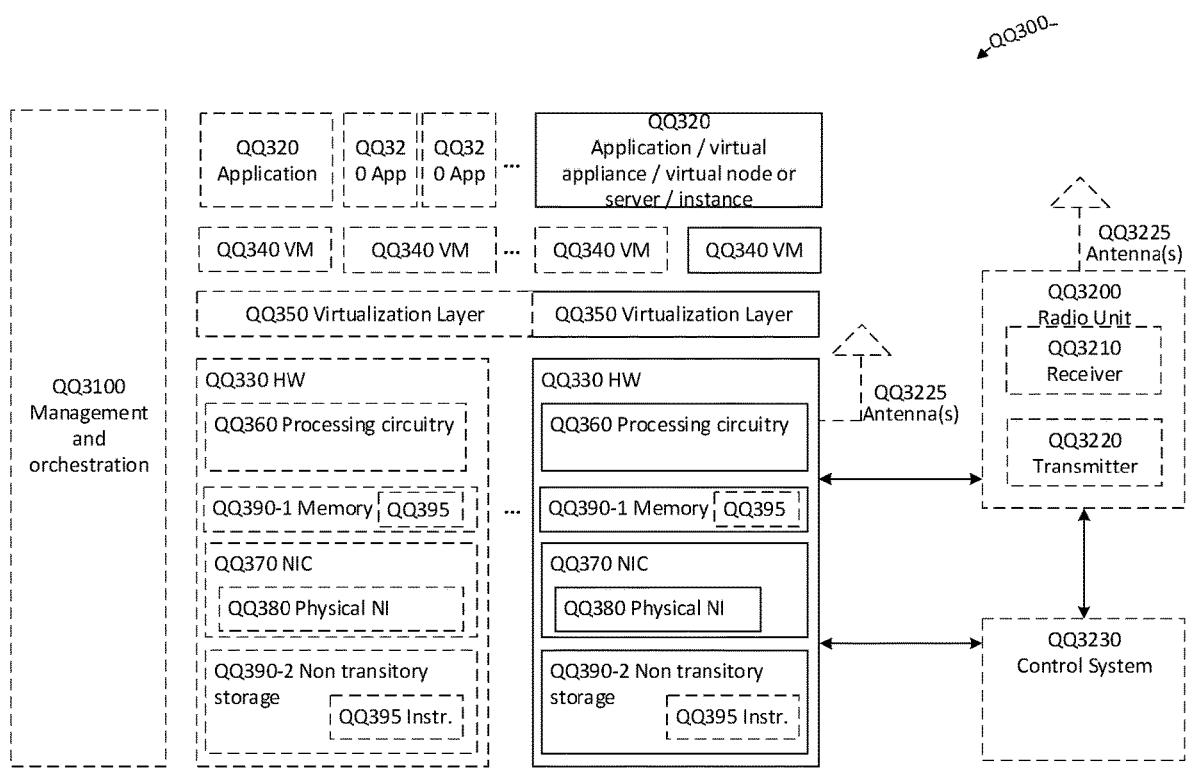
FIG. 9 illustrates a virtualization environment in which functions implemented by some embodiments may be virtualized.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
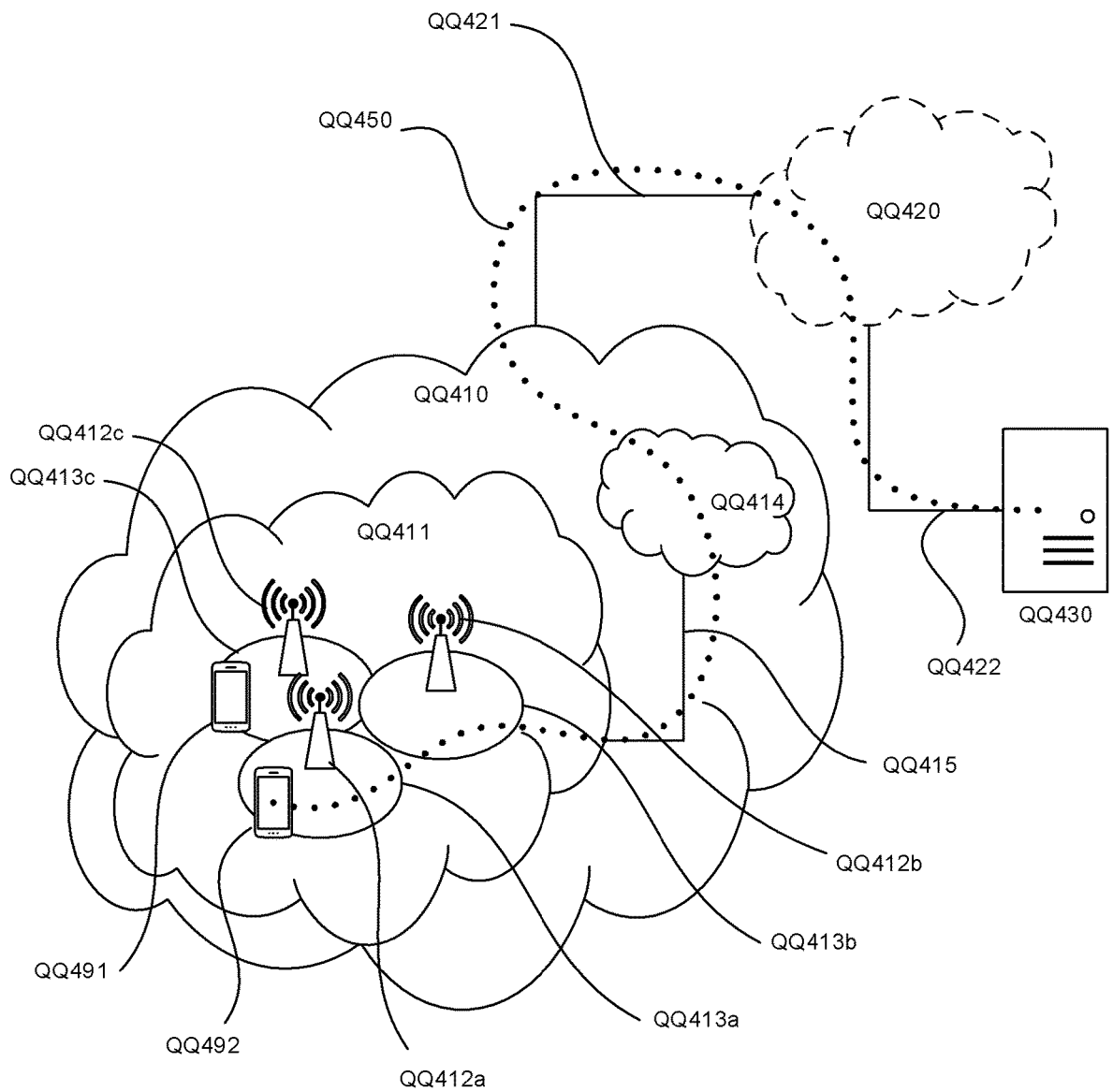
FIG. 10 illustrates a telecommunications network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
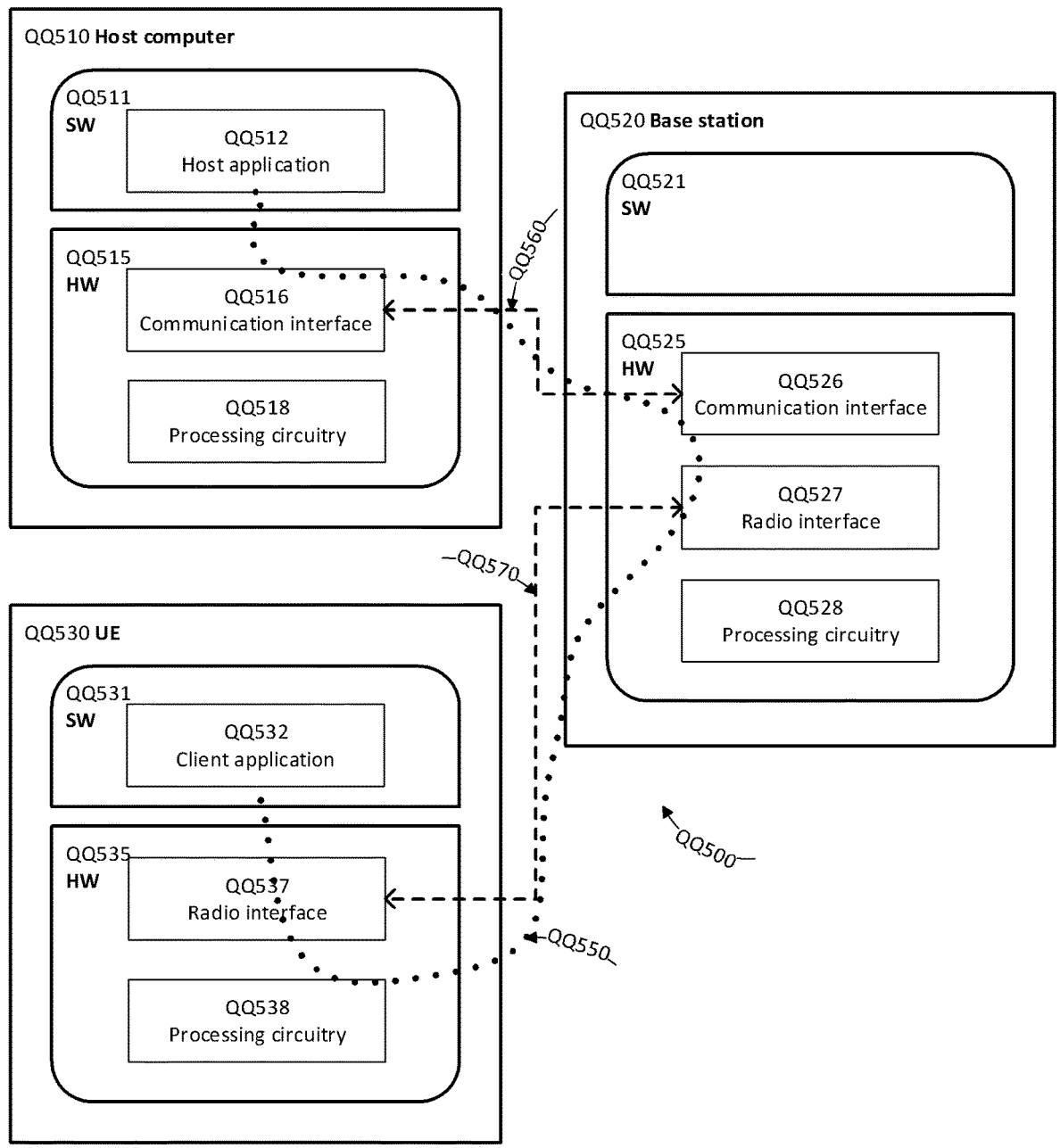
FIG. 11 illustrates a host computer communicating via a base station with a user equipment over a partially wireless connection in accordance with some embodiments.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate achievable by a UE connected to a base station operating in accordance with the methods disclosed herein, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
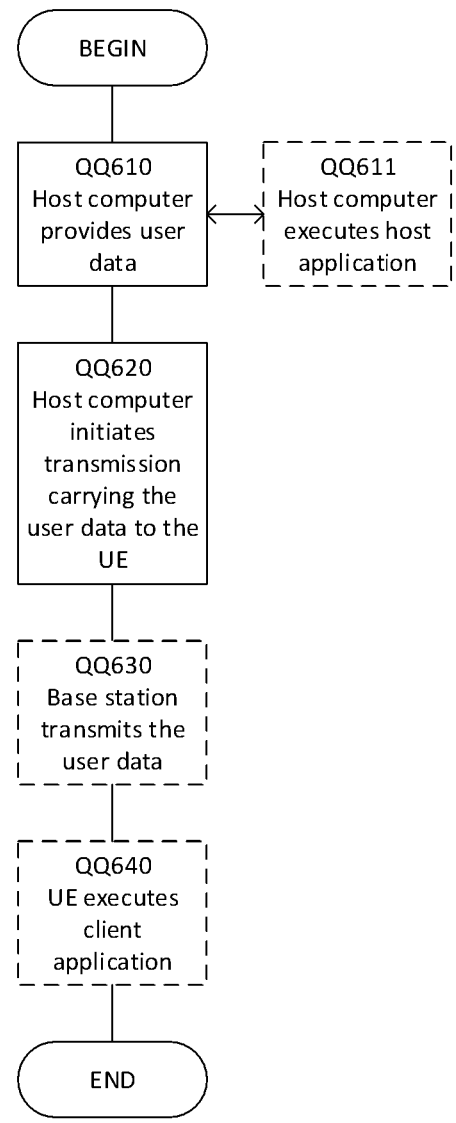
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
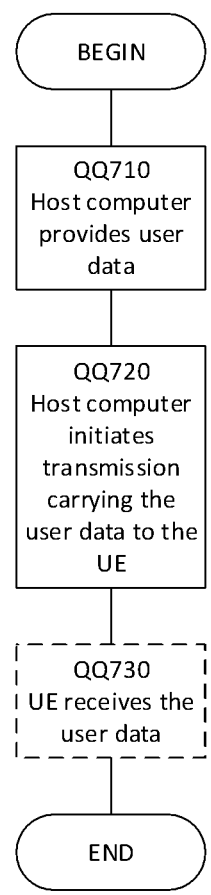
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
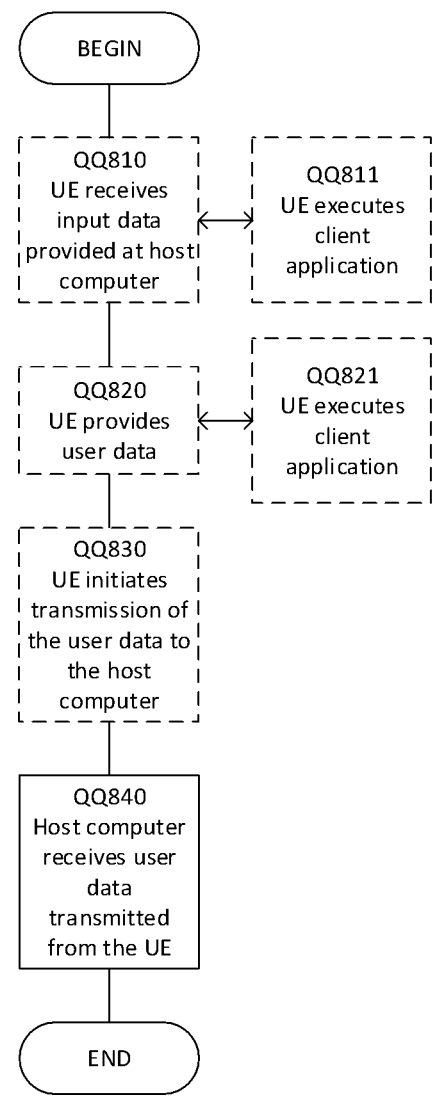
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
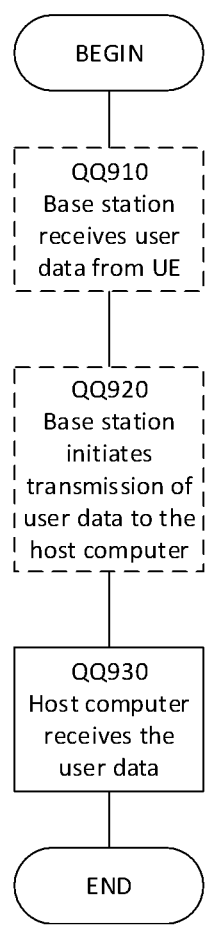
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project 5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IAB Integrated access and backhaul
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MT Mobile termination
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RMSI Remaining Minimum System Information
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSB SS/PBCH block comprises of PSS, SSS, and PBCH including the DMRS for the PBCH
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method performed at an integrated access and backhaul (IAB) node, comprising:
during the IAB node initial access to a first parent IAB node, wherein the IAB node firstly join an IAB back- haul link, assuming a predetermined synchronization signal block (SSB) transmission periodicity;

searching an SSB at the predetermined SSB transmission periodicity; and getting access to the first parent IAB node according to the searched SSB.

2. The method of claim 1, further comprising:

receiving system information from the first parent IAB node, according to the searched SSB; and obtaining actual SSB transmission periodicity from the received system information.

3. The method of claim 2, wherein the searching an SSB at the predetermined SSB transmission periodicity comprises, searching a set of SSBs at the predetermined SSB transmission periodicity regardless of periodicity information on SSBs indicated in a broadcast signal.

4. The method of claim 3, wherein the SSBs indicated by the obtained actual SSB transmission periodicity are for specific use in an IAB backhaul link.

5. The method of claim 3, wherein the SSBs indicated by the obtained actual SSB transmission periodicity are reusing a same set of SSBs used for access UEs.

6. The method of claim 2, when the IAB backhaul link between the IAB node and the first parent IAB node get failure, further comprising:

searching an SSB at the obtained actual periodicity of SSBs; and getting initial access to a second parent IAB node, wherein the second parent IAB node differs from the first parent IAB node.

7. The method of claim 1, wherein the IAB node is under a non-standalone (NSA) deployment.

8. A method performed at an integrated access and backhaul (IAB) node, comprising:

during the IAB node initial access to a parent IAB node, determining its availability of synchronization signal block (SSB) transmission periodicity;

upon determining there is no information on actual SSB transmission periodicity in the IAB node, assuming a default SSB transmission periodicity;

searching an SSB at the default SSB transmission periodicity.

9. The method of claim 8, further comprising:

upon determining an actual SSB transmission periodicity is available in the IAB node, searching an SSB at the actual SSB transmission periodicity.

10. The method of claim 9, wherein SSBs indicated by the actual SSB transmission periodicity are for specific use in an IAB backhaul link.

11. The method of claim 9, wherein SSBs indicated by the actual SSB transmission periodicity are reusing a same set of SSBs used for access UEs.

12. The method of claim 8, wherein the determining its availability of SSB transmission periodicity by the IAB node is a feedback to a failure of IAB backhaul link between the IAB node and its parent IAB node.

13. The method of claim 8, wherein the IAB node is under a non-standalone (NSA) deployment.

14. An integrated access and backhaul (IAB) node, comprising:

processing circuitry configured to execute program code stored in the memory, cause the IAB node to:

during the IAB node initial access to a first parent IAB node, wherein the IAB node firstly join an IAB backhaul link, assume a predetermined synchronization signal block (SSB) transmission periodicity;

search an SSB at the predetermined SSB transmission periodicity; and get access to the first parent IAB node according to the searched SSB.

15. The IAB node according to claim 14, wherein the memory further includes instructions with, when executed by the processing circuitry, cause the IAB node to:

receive system information from the first parent IAB node, according to the searched SSB; and obtain actual SSB transmission periodicity from the received system information.

16. The IAB node according to claim 15, wherein the memory further includes instructions with, when executed by the processing circuitry, cause the IAB node to:

when the IAB backhaul link between the IAB node and the first parent IAB node get failure, search an SSB at the obtained actual periodicity of SSBs; and get initial access to a second parent IAB node, wherein the second parent IAB node differs from the first parent IAB node.

17. The IAB node according to claim 15, wherein the SSBs indicated by the obtained actual SSB transmission periodicity are for specific use in an IAB backhaul link.

18. The IAB node according to claim 15, wherein the SSBs indicated by the obtained actual SSB transmission periodicity are reusing a same set of SSBs used for access UEs.

19. The IAB node according to claim 14, wherein the IAB node is under an NSA deployment.

* * * * *